United States Patent
Fattouch

(10) Patent No.: US 6,892,073 B2
(45) Date of Patent: May 10, 2005

(54) METHOD OF AND APPARATUS FOR CREATING CONSTRAINT MATRICES

(75) Inventor: Imad Fattouch, Paris (FR)

(73) Assignee: Societe Francaise du Radiotelephone, Paris la Defense (FR)

( * ) Notice: Subject to any disclaimer, the term of this patent is extended or adjusted under 35 U.S.C. 154(b) by 440 days.

(21) Appl. No.: 10/215,362

(22) Filed: Aug. 9, 2002

(65) Prior Publication Data

US 2003/0073441 A1 Apr. 17, 2003

(30) Foreign Application Priority Data

Aug. 10, 2001 (FR) .............................................. 01 10720

(51) Int. Cl.$^7$ ................................................. H04B 7/20
(52) U.S. Cl. .................. 455/446; 455/67.11; 455/67.13
(58) Field of Search ................. 455/446, 449, 455/442.1, 67.13, 67.11, 423, 403, 450, 452.2

(56) References Cited

U.S. PATENT DOCUMENTS

| | | | | |
|---|---|---|---|---|
| 5,307,510 A | * | 4/1994 | Gunmar et al. | 455/67.11 |
| 5,561,841 A | * | 10/1996 | Markus | 455/446 |
| 5,710,758 A | * | 1/1998 | Soliman et al. | 370/241 |
| 5,768,687 A | | 6/1998 | Marzoug | |
| 5,926,762 A | * | 7/1999 | Arpee et al. | 455/447 |
| 5,987,328 A | * | 11/1999 | Ephremides et al. | 455/446 |
| 6,111,857 A | | 8/2000 | Soliman et al. | |
| 6,336,035 B1 | * | 1/2002 | Somoza et al. | 455/446 |
| 6,408,185 B1 | * | 6/2002 | Freeman et al. | 455/446 |
| 6,487,414 B1 | * | 11/2002 | Tanay et al. | 455/450 |
| 6,535,747 B1 | * | 3/2003 | Shah et al. | 455/522 |

FOREIGN PATENT DOCUMENTS

| | | |
|---|---|---|
| EP | 0 847 213 A2 | 6/1998 |
| WO | WO 94/03986 A1 | 2/1994 |
| WO | WO 99/26439 A1 | 5/1999 |

* cited by examiner

Primary Examiner—Charles N. Appiah
(74) Attorney, Agent, or Firm—Lowe, Hauptman & Berner, LLP

(57) ABSTRACT

A computer system generates constraint matrices for planning a cellular, wireless telephone network. A given number of specified carrier frequencies are allocated to plural radio base stations having specified positions and transmission powers. The stations act as a server cell or an interfering cell in a service zone. The computer: (1) predicts the field strength C of a field received in a mesh in the service zone at one of the server cell predetermined frequencies; (2) computes (a) for each of the meshes, the strength I of the interference field generated by the interfering cells, and (b) C/I for the "server" cell provided I of an interfering field received in the mesh is larger than a predetermined value; and (3) determines a global interference proportion $tb_{ij}$ which is displayed or stored in a constraint matrix by integrating C/I over the entire service zone.

22 Claims, 4 Drawing Sheets

50i

| | Cell-1 | Cell-2 | Cell-i | Cell-n |
|---|---|---|---|---|
| Cell-1 | | Ki 10% | Li 4% | Mi 8% |
| Cell-2 | | | Xi | Yi |
| Cell-j | | | tb$_{ij}$ | Zi |
| Cell-n | | | | |

| | | | | |
|---|---|---|---|---|
| | | Kj 9% | Lj 8% | Mj 7% |
| | | | Xj | Yj |
| | | | | Zj |
| | | | | |

FIGURE 2.2

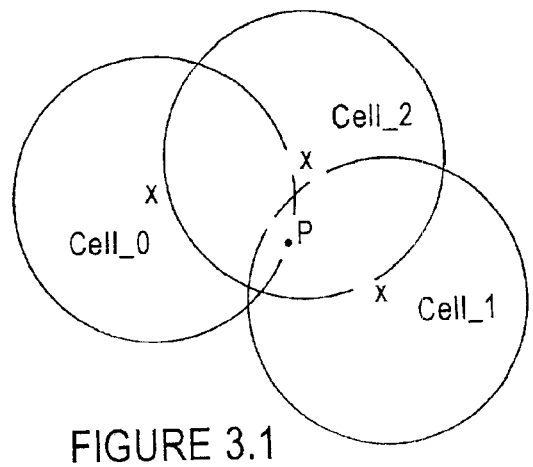
FIGURE 3.1
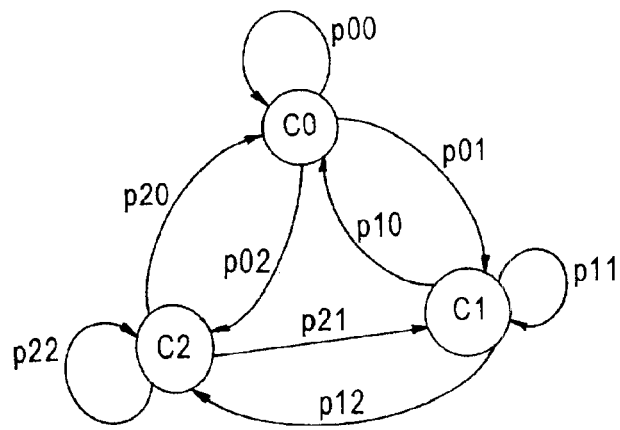
Status Diagram for Allocation-Probability Calculation
FIGURE 3.2
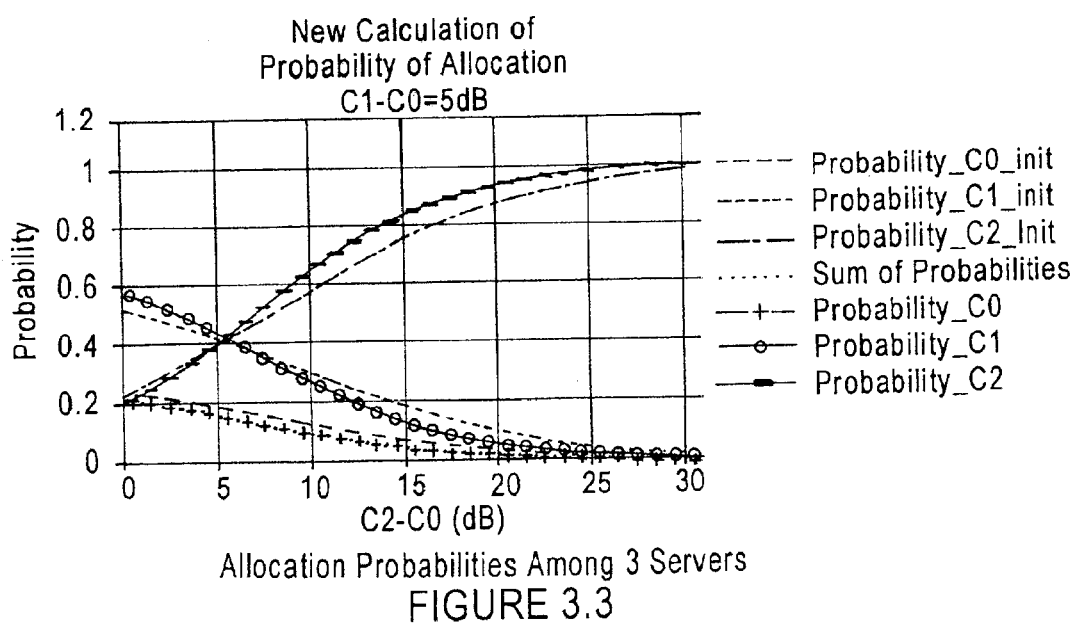
Allocation Probabilities Among 3 Servers
FIGURE 3.3

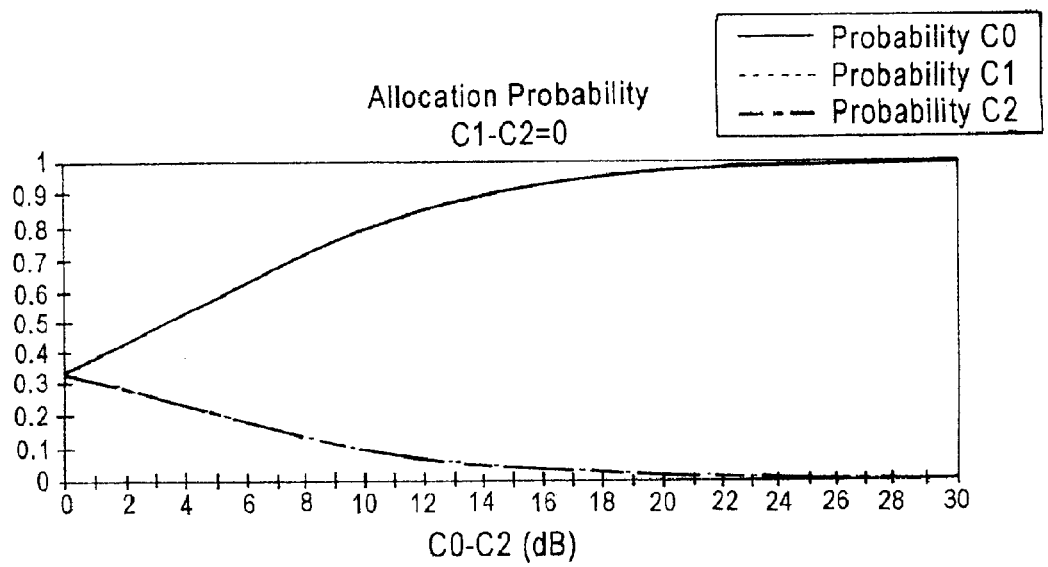
FIGURE 4.1
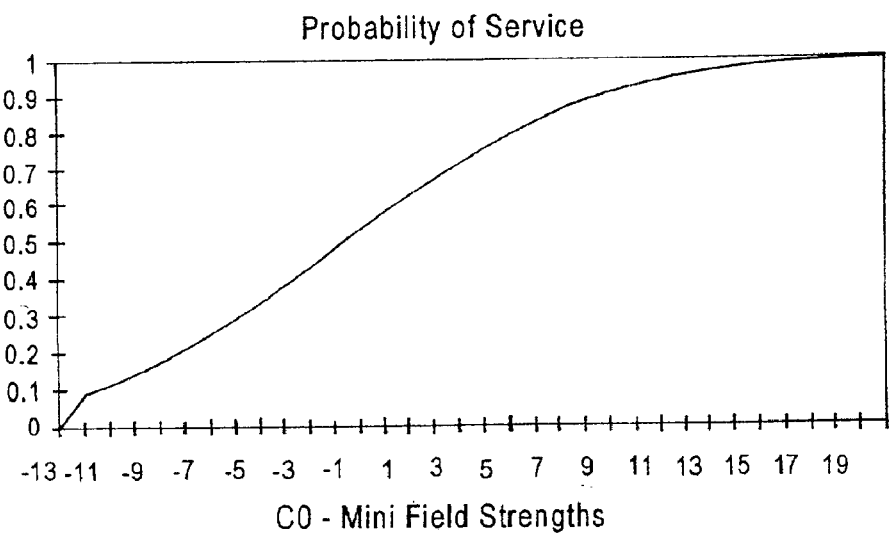
FIGURE 4.2
| Class -> | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| No Artery | 0 | 1 | 1 | 1 | 1 | 5 | 5 | 5 | 8 | 8 | 10 | 10 | 10 | 10 | 10 | 10 |
| Interstate Highways | 0 | 10 | 10 | 10 | 10 | 20 | 20 | 20 | 20 | 20 | 20 | 25 | 25 | 25 | 25 | 25 |
| State Roads | 0 | 4 | 4 | 4 | 4 | 10 | 10 | 10 | 16 | 16 | 16 | 16 | 20 | 20 | 20 | 20 |
| Rail Road(s) | 0 | 4 | 4 | 4 | 4 | 8 | 8 | 10 | 15 | 15 | 15 | 15 | 20 | 20 | 20 | 20 |
| County Roads | 0 | 3 | 3 | 3 | 3 | 8 | 8 | 10 | 15 | 15 | 15 | 15 | 18 | 18 | 18 | 18 |
| Local Roads | 0 | 2 | 2 | 2 | 2 | 8 | 8 | 10 | 15 | 15 | 15 | 15 | 18 | 18 | 18 | 18 |
| Main Streets | 0 | 1 | 1 | 1 | 1 | 5 | 5 | 5 | 8 | 8 | 10 | 12 | 15 | 15 | 15 | 15 |
| Secondary Streets | 0 | 1 | 1 | 1 | 1 | 5 | 5 | 5 | 8 | 8 | 10 | 12 | 15 | 15 | 15 | 15 |
FIGURE 4.3

METHOD OF AND APPARATUS FOR CREATING CONSTRAINT MATRICES

FIELD OF THE INVENTION

The present invention relates to a method and apparatus for creating constraint matrices to be used in planning carrier frequencies to be assigned to the base stations designed to manage the cells of a cellular wireless telephone network being established.

BACKGROUND OF THE INVENTION

A cellular wireless network such as the GSM network includes a plurality of ground base stations interconnected by the wired telephone network and which can be accessed by the mobile terminals within the radio cell of one station. A so-called up-link, that is from the terminal to the network, is implemented in a first frequency band whereas the down-link from the network to the terminal is implemented in a second frequency band. Each frequency band is divided into several channels, for example 62 channels, each of a given width, for instance 200 kHz. A spectrum gap called the "duplex spacing" separates the uplink frequency band from the down-frequency band.

Each base station must exhibit sufficient range that the cell under consideration spills over into its neighboring cells in order to eliminate any danger of communication loss when a mobile terminal changes cells. This requirement entails increasing the stations' transmitted power beyond the inherently required power.

Therefore a mobile wireless terminal effectively receives the transmissions from two stations when the wireless terminal is situated in the overlap zones of two cells. Actually the wireless terminal receives many more stations and, when powered 1 it communicates in a wireless manner with the electronically nearest station, by feeding the nearest station a radio level which is the highest from the six optimal levels. Within the overlap zone, the transmissions from the station not selected by the terminal constitute an interfering signal of the same approximate magnitude as the useful signal of the hookup cell. Also, because the signals from the two stations include frames having the same structure, the terminal may not be able to effectively filter the spectrum to attenuate the noise signal.

The operator is allocated a range of frequencies representing a costly resource with which to set up the radio network. When in this range, the operator regularly configures carrier frequencies, or transmission channels. The frequency gap between two carriers is sufficiently large so that the cross-channel interference remains less than a given threshold for good operation on account of the receivers' selectivities.

The number of the available carrier-frequencies however is much less than the number of channels required in the entire network. As a result the same frequency value must be used several times, and a check must be carried out in each cell to assure that the interference level at its carrier(s) and originating at the stations of the other neighboring cells remains below the threshold of proper operation. In other words, at any point in a cell, a safety margin must be provided between the received useful signal and the level of the interfering signal at the frequency under consideration. Because one network comprises several thousand stations that interfere with each other, calculating such interferences entails a large number of hours of calculation when using a conventional computer of average power.

This problem is compounded furthermore in that a terminal which is also linked to a station tolerates inversion between the relative signals received from its stations and from another station and links up with the latter only if the gap between the levels exceeds a given value of a hysteresis threshold. Again, the levels received from the diverse stations can randomly change in time as a function of the radio transmission and the position of the mobile terminal.

Moreover the noise signals from distant-station frames exhibit mean energies that change with traffic and the phases of their received carriers can slip relative to each other and in this manner can produce random modulation of the instantaneous amplitude of the received composite noise signal constituting their vector sum.

When the operator plans the network by fixing the positions and the radio features of the stations, the frequency allocation therefor must be based on optimization computations, the purpose of which is to determine a maximum number of occurrences to each carrier in the network while also assuring optimally the safety margin of the real signal in the light of the above hazards.

One of the factors defining the safety margin involves using constraint matrices listing constraints which must be obeyed between the various cells of the network.

It is known to use so-called "hard" constraint matrices for such planning. However, these matrices often are determined from the start on the basis of criteria assigned by the programmer and then are used in planning.

Illustratively the programmer in the prior art fixes his matrix by assigning a coefficient, for instance the value of 0, to the intersection of column Cj and the line Cl of the constraint matrix when the gap between the two channels of two cells Ci, Cj already is 0 (that is when the two cells are at the same frequency), or the value "1" when the gap between the respective frequencies has a first, fixed value and the value "2" when the gap between the respective frequencies has a second fixed value.

Such definitions however are frozen and subjective.

An objective of the present invention is to create an optimizing tool for creating constraint matrices that reflect reality as closely as possible and to use these optimized constraint matrices in planning a cellular wireless telephone network.

SUMMARY OF THE INVENTION

Accordingly, one aspect of the invention relates to a method of creating constraint matrices for use in planning a cellular, wireless telephone network, whereby a given number of carrier frequencies is assigned to a plurality of base stations of given positions and transmission powers within a service zone are used to manage a corresponding plurality of radio cells operating as server or interfering cells, said method comprising the following stages:

- on the basis of the positions of each mesh of a server cell, the computing system devises a prediction representing the value C of the field received within this mesh from the service zone at one of the predetermined frequencies of the server cell,
- within each of said meshes, the computing system calculates the value of the interference field generated by each of the other cells taken into account by said system as interfering with the cell assumed to be the server by said system,
- within each of these meshes, the computing system calculates the C/I ratio for the "server" cell where I is the interference field strength generated by each of the other interfering cells of the service zone and of which the magnitude of the interference field strength I received in the mesh is larger than a predetermined value "MINI_INTERFERING_FIELD" initially stored by said system, integrating over all the service zone, the computing system determines the global interference proportion $tb_{ij}$ by the interfering cells affecting the server cell, such values then being displayed or stored in a so-called initial constraints matrix displaying or storing field strengths (Ki, Li, Mi) at the intersections of the rows denoting server cells and columns denoting interfering cells.

based on said "initial" constraints matrix, the computing system determines probabilities of service at initialization to indicate the probability that the server cell applies to the mobile terminal in a given cell the highest field strength, the probability of service being deduced from the gap between the predicted field strength and the modifiable value of a "MINI FIELD" stored in a file "Frequencies.txt".

In another feature of the method fo the invention, a first matrix or table is drawn up assuming each server cell and each interfering cell is in co-channel interference.

In another feature of said method, said modifiable value of the MINI_FIELD field corresponds to a probability of service of 50%., and by comparing matrix values, the computing system selects those three cells which will be the optimal servers, Then said system calculates allocation probabilities and stores them in an allocation constraints matrix.

In another feature of the method of the invention, and with respect to each mesh, the computing system applies to each of these potential server cells a weighting coefficient exhibiting three coefficients:

allocation probability, service probability, above-ground structure weighting, where these three coefficients are combined at each mesh to weight each of three optimal-server cells and to account for the probability of each being the optimal server cell.

In yet another feature of the method of the present invention, said computing system calculates—by means of the probabilities of the three optimal servers and a relation linking them to the probabilities of transition pij from a cell_i to another cell_j while taking into account the hysteresis margin of the handover Hom—a single value Prob_init which in this manner allows constituting and determining step by step an initial probability matrix.

In still another feature of the method of the present invention, the allocation probability accounts for the probable distribution of time allocated to each of the three potential server cells over the duration of a communication, said probability being calculated from the predicted field strength difference between the potential server cells and taking into account a mean value of a switching margin "HO_MARGIN" actually equal to 5 dB.

In another feature of the method of the invention, the probability values are stored in the file "Probab_assig.txt".

In another feature of the method of the present invention, the above-ground structure (or morphological) coefficient allows accounting for the natural "handover" flows that move along the terrain morphology, the cells relating to the same above-ground structures as the server cell of the moment being favored, said coefficient being retrieved from a file "Weight.txt" in the form of a matrix involving the kind of above-ground structure and the kind of traffic axis the mesh belongs to.

In another feature of the method of the present invention, the computing system carries out the same calculations as in one of claims 1, 3 and 4 for those cells using frequencies of which the channel is adjacent to the frequency channel of the server cell.

In another feature of the method of the present invention, the computing system also takes into account the determined interferences and the adjacent areas are considered by adding their effects (in interference co-channel and adjacent channel modes) to the results derived from their coverage, such effects being stated in the form of a proportion stored in a file "Frequencies.txt".

In another feature of the method of the present invention, the computing system is fitted with statistical tables of fluctuations of radio propagation affecting the received signal strengths of the stations' transmissions, and said system determines corresponding probabilities in order that the signal strength of a received signal will be the highest of all levels over a specified time interval.

Another objective of the present invention is an apparatus generating constraint matrices allowing improved modeling reality.

This objective is attained in that the apparatus generating constraint matrices that will be used in planning a cellular wireless telephone network of which a data system is fitted with a given number of values of predetermined carrier frequencies to be allocated to a plurality of radio base stations of specified positions and transmitted powers within a service zone and stored in a database of which the data will manage a corresponding plurality of radio cells (1–4) that act as server or interfering cells, said apparatus also including means which shall work out, according to the positions of each mesh (P) of a server cell, a predicted value C of received field strength within this mesh of the service zone at one of the predetermined frequencies ($f_i$) of the server cell, further including means which for each of said meshes shall calculate the value I of the interference field strength generated by each of the other cells that said system deems an interfering cell acting on the assumed server cell and means storing these values I, means for calculating for each of these meshes the value of a ratio C/I for the "server" cell where I represents the interference field generated by each of the other interference cells of the service zone and of which the interference field value I received in the mesh exceeds a predetermined value "MINI INTERFERENCE_FIELD" stored initially by the computing system, means to integrate over the full service zone, the computing system determining the global interference proportion $tb_{ij}$ of the server cell affected by the interfering cells, said values then being optionally displayed or stored by appropriate means into a so-called initial constraints matrix by representing or storing the field strengths (Ki, Li, Mi) at the intersections of the rows denoting server cells and columns denoting interfering cells.

In another feature of the apparatus of the present invention, the means are used to calculate a first given matrix or table by postulating each server cell and each interfering co-channel cell, then a second matrix postulating each interfering cell in a channel adjacent to the server cell.

In yet another feature of said apparatus of the invention, said modifiable MINI_FIELD value corresponds to a probability of service of 50%, said apparatus comprising:

computing-system selection means selecting in this manner three cells constituting the optimal servers by means of matrix-values comparison, and means determining by calculation the probabilities of allocation and the storage of these probabilities in a constraints matrix.

In a still further feature of the apparatus above, and as regards each mesh, the computing system comprises means storing three coefficients constituted by a coefficient of:

probability of allocation probability of service weighting the above-ground structures, and means to combine these coefficients at each mesh to weight each of the three optimal-server cells and to render account of the probability each one has to become the server cell.

In yet another feature of the apparatus of the invention, said computing system calculates—using the three probabilities of the three optimal servers retrieved from the calculated matrices and of a relation linking these probabilities to the transition probabilities pij from a cell_i toward another cell_j while taking into account the handover hysteresis margin Hom—a single value Proba_init which in this manner allows determining and constituting in stepwise manner an initial probability matrix.

In another feature of the apparatus of the present invention, the allocation probability values are stored in a file "Proba_alloc.txt".

In yet another feature of the apparatus of the invention, the above-ground structure coefficient is stored in a file "Weight.txt" in the form of a matrix of the kind of above-ground structures and the kind of traffic artery of which the mesh is a part.

In another feature of the apparatus of the present invention, the computing system comprises interactive means allowing taking into account the interferences and adjacent areas by adding their effects (as interference co-channel and adjacent channel) to the results derived from the preceding calculations, such effects being stored as a proportion in a file "Frequencies.txt" itself stored in memory.

Accordingly the radio environment of the cell is defined more accurately and consequently the frequency planning can be improved while only limited computing power is needed.

Thus a limited number of base stations—the most interfering ones—can be easily selected, and the required computing power is commensurately limited while nevertheless good accuracy is assured because the constraints matrix better renders the actual terrain when anticipating interferences.

In this manner the magnitude of the composite signal well renders the diverse radio conditions at the various cell sites and therefore provides a reliable model to be used in comparison.

The above mentioned modeling is furthermore improved by taking into account interferences from adjacent frequencies due to the quality of rejection of said adjacent frequencies that are present in the receiving mobile terminals.

The invention is described in the following description of a preferred but not limitative implementation of the method of the present invention and in relation to the attached Figures.

DETAILED DESCRIPTION OF THE DRAWING

Figure 1:
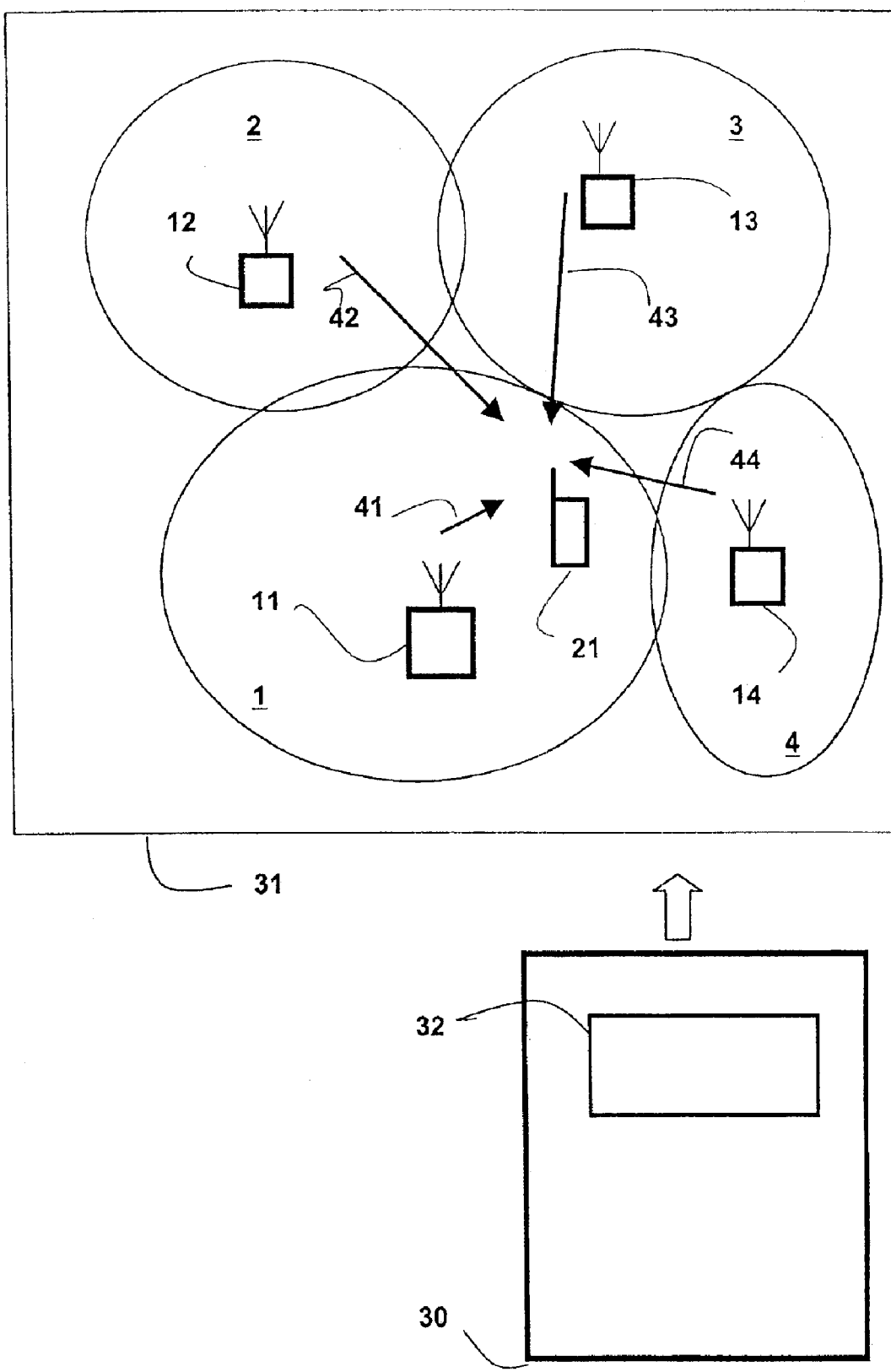
FIG. 1 is a schematic diagram of a portion of a cellular wireless telephone network being planned, Each of FIGS. 2.1, 2.2 is a matrix of inter-cell interference coefficients that act as database and chat is attained by performing the method of a preferred embodiment of the invention, FIG. 3.1 is a diagram of the interactions of three cells that are developing the inter-cell interference probabilities to attain a database for determinating the constraint matrices, FIG. 3.2 is a status diagram for calculating the allocation probabilities between the three cells, FIG. 3.3 is a diagram for allocation probabilities between the three server cells, FIG. 4.2 is a plot of the probability of service for given gap values, FIG. 4.3 is a diagram of a matrix indicating different above-ground structures versus different classes of traffic arteries.

FIG. 1 includes a map 31 of a geographic zone of a cellular wireless telephone network being defined, said map showing the anticipated positions of four radio cells respectively references 1, 2, 3 and 4 respectively enclosing base stations 11, 12, 13 and 14. As indicated in this FIG. 1 the cells 1 through 4 are near each other, and there is overlap between the edge areas of the cell 1 with those of the other three cells 2 through 4.

The map 31 represents the data of a digital map 32 stored in the database of a computer 30. The digital map 32 specifies natural and artificial salients, furthermore what they are, for instance being woods, buildings and others, whereby it is possible to mathematically estimate the link's radio attenuation as a function of the salients defined in the digital map 32.

The operator of the network to be set up can use a range of frequencies and illustratively already has defined a plurality of 62 carrier frequencies constituting transmission channels which in this instance are digital such as those of the GSM network. The frequency values also are distributed within the particular frequency range according to an inter-frequency gap which is determined as a function of frequency selectivity of the base stations 11 through 14 and of the mobile wireless telephone terminals to be used such as the one denoted 21 shown in cell 1.

As illustrated by arrows 41, 42, 43 and 44, the mobile terminal 21 can receive transmissions from the four base stations or cells 11 through 14, the respective received signals being a genuine signal from the server cell or an interference signal from one of the other cells termed interfering cells. The server cell at one site of the network is the cell assuring communication. Accordingly this is the cell selected by the standby mobile wireless telephone terminal when communication was set up or which was selected as the target when a socalled handover server cell was switched. The corresponding wireless link quality can be checked as a function of the positions of the stations 11 through 14 relative to that of the mobile terminal 21, that is, by computing the transmission attenuation. In particular this attenuation depends on the distance between the particular transmitter involved and the receiving mobile terminal 21 and can be easily calculated as regards a free-space transmission in air based on attenuation per unit distance which is about 20 dB/km for the range of frequencies being considered and for the first 500 m, and 30 dB/km beyond. If there should be obstacles to radio propagation, the salients information offered by the database 32 allows estimating the link budget along a given path of propagation. When the receiving site is selected substantially in line of sight with the transmitting stations 12 through 14, the received signal strength can be calculated in a simple manner by the attenuation being considered that of free space and is given by the predetermined number of dB/km (20 or 30 dB/km). Moreover the signal strengths can be obtained by field measurements.

Line of sight view means that the first Fresnel ellipsoid is not significantly masked by a radio obstacle. It is known that the first Fresnel ellipsoid is defined as being the volume generated by rotating an ellipse about its longitudinal axis, with the transmitter and the receiver 21 respectively situated at each of its foci, at a given distance, the eccentricity being defined in that the sum of the two distances of any point on the ellipsoid surface to the foci does not exceed the distance between these foci by more than one carrier wavelength. In other words, the major portion of the received power at a focus is transmitted inside the first Fresnel ellipsoid. As a result the absence of any substantial obstacle in this ellipsoid is equivalent to transmission in air, without further attenuation.

The map 31 being correspondingly notated therefore allows the computer 30 to calculate an anticipatory level of radio field strength C at any point where there are incident signals from the base stations 11 through 14, provided the transmission strength was fixed beforehand.

The positions of the base stations 11 through 14 and the transmission powers having been set beforehand, the next task is to ascertain the degree of acceptable geographic containment at one given carrier frequency. As already discussed above, desirably one given carrier frequency is used repeatedly a maximum number of times; however intercell interference does not degrade radio service quality above a given threshold.

In order to ascertain whether this threshold was reached in cell 1 for instance, simulation is carried out, in practice using the computer 30, to estimate the field strength I due to noise at a given carrier frequency.

To plan the cellular wireless network containing a given and hence bounded number of values of carrier frequencies to allocate to the plurality of radio base stations 11 through 14, the method of the invention allows analyzing constraint matrices by performing the following steps:

The first elements of the constraint matrix are set up based on the prediction calculated by the computing system for each cell impacting the service zone. This prediction is described for a given cell by the strength C of the received field in each mesh p (FIG. 4.1) of the service zone. The computing system calculates the ratio C/I for the server cell in each mesh, for instance in Cell_1, and in each of the other interfering cells of the service zone, for instance Cell-2, Cell-3 of FIG. 4.1 (of which the field strength received in the mesh is larger than a given value "INTERFERING-MINI-FIELD" that was stored initially by the user in a file "Frequencies.txt" of the computing system 30). The value I represents the interfering field strength corresponding to an interfering cell (for instance Cell-j) of the server cell (for instance Cell-I). Those values imply interference in the server cell by the other co-channel cells. This ratio also is calculated in the adjacent channels for each mesh P.

Integrating over the entire service zone, the global interference proportion $tb_{ij}$ caused by the interfering cells can then be determined in the server cell. Thereupon these values can be entered into the constraints matrix.

FIG. 2 is an illustration of a square matrix 50$i$ listing the magnitudes of the mutual interference between all of cells 1 through 4 of the network; the matrix of FIG. 2 is called the constraint matrix for one frequency $f_i$ of the carrier frequencies.

In this manner the value at each row-column intersection of the matrix 50$i$ indicates—in a synthetic manner and to planning software for the network operated by the computing system 30 or to a human operator using this computing system—the interference proportion $tb_{ij}$ of each server Cell-j corresponding to the row j caused by the interfering Cell-i corresponding to the column i in order to use said proportion in the selected frequency allocation to the base stations 11 through 14. This analysis of the interfering proportion $tb_{ij}$ allows derivation analyzing of two analyzing matrices, a first matrix to analyze co-channel interferences and a second matrix for analysis of adjacent-channel interference. Co-channel interference is derived by again using the same carrier in the neighboring cells. Adjacent-channel interference is due to adjacent carriers in the neighboring cells.

If called for, the method of the invention allows taking into account a log of interference. A log of interference at a site between two given cells is interference identified in particular by "terrain" measurements. The computing system takes a log of interference into account by adding the value of the field strength "proportion_exception" of a file "FREQUENCY.TEXT" stored in the computing system for the corresponding element in the constraints matrix.

Accordingly the interference levels of the cell 1 due to the cells 2, 3, 4 respectively have values Ki, Li and Mi. Similarly the cell 2 is perturbed to levels Xi and Yi by the respective cells 3 and 4, the latter two being mutually perturbed at a level Zi. Matrices of the same type such as the matrix 50$j$ for the frequency $f_j$ of FIG. 2.1 can be set up for the various carrier frequencies, whereby an overview is accessible of the radio interference constraints Kj, Lj, Mj, Xj, Yj, Zj. Each matrix 50$i$ or 50$j$ is actually a database accessible to the computer 30, the present illustration being merely didactic.

If, in each mesh P of the service zone, the server Cell-i were systematically the "optimal-server" cell that exhibits the best probability, the preceding calculations would be direct and simple. However they would not adequately represent the actual network operation. The variations in received field and the local displacements of the mobile terminal during communication entail fluctuations and consequently changing the server cell (handover). With respect to a given mesh and according to the GSM standard for handover, the server cell can be the current cell or one of its designated six optimal adjacent cells. On practical grounds (computing time and limited information), the computing system considers only the cells Cell_0, Cell_1, Cell_2 at a first field strength (C0), a second field strength (C1) and a third field strength (C2) as being potential server cells.

An objective of the present invention is to provide a probability calculation that provides the best rendering of the actual system when each of three cells that can constitute an optimal server are considered. This calculation is derived by using the status diagram for three cells shown in FIG. 3.2, wherein the initial state corresponds to energizing the mobile terminal telephone. The calculation is carried out by using the following notation:

Proba_Ci(P): probability that the pixel P of the coverage zone is allocated to the cell Cell_i, Proba_Ci init(P): probability Proba_Ci(P) that the pixel P of the coverage zone is assigned to the cell Cell_i when the mobile terminal is powered ON, HOm: the handover hysteresis margin.

Assume three cells Cell_0, Cell_1 and Cell_2 (FIG. 3.1). The field strength measured at a pixel P of the covered zone by these three cells is C0(P) from Cell_0, C1(P) from Cell_1 and C2(P) from Cell_2.

A mobile terminal situated at P picks up a field strength which changes according to Gaussian probability having a mean value C0, C1 and C2 respectively in natural log. The probability that the mobile terminal is allocated to the cell I (i∈{0,1,2}) while energized (allocation probability "init") is the probability of the field strength Ci(P) being the largest. The statistics being the same for the three field strengths at P, this probability depends only on the mean value Ci of the received field strengths and the standard gap of the propagation model which in this instance is assumed to be 8 dB.

The computing system 30 works on the mean values. Accordingly, in each pixel P, and as regards the three optimal servers, there are three mean ordinates C0, C1 and C2. To calculate the allocation probabilities, the system only involves the gap between the three mean values. As a result there is always one of the three cases of standard gaps cited below:

0 stronger_field-smaller_field intermediary_field-smaller_field.

For instance, assuming that the sequencing between the mean values is C2≧C1≧C0, the system calculates for each server cell Ci the probability Proba_Ci_init(C2−C0, C1−C0), therefore Proba_C0_init (C2−C0, C1−C0) represents the number of times the smallest mean value of the Gaussian field was the largest of the three, Proba_C1_init(C2−C0, C1−C0) represents the number of times the intermediate mean value of the Gaussian field was the largest of the three, Proba_C2_init(C2−C0, C1−C0) represents the number of times the largest mean value of the Gaussian field was the largest of the three.

Such results are shown in FIG. 3.3 under the heading Proba_Ci_init and show, for a given probability, the allocation of a cell according to C2−C0 variations between 0 and 30 dB and for a C1−C0 value that is fixed at 5 dB. Therefore given a probability less than 0.2, the server cell is the cell that generates the field C0 until a gap C2−C0>12 dB. For a probability between 0.2 and 0.6, the server cell is the cell that generates the field C1 until there is a gap of 7 dB and becomes the cell that generates the field C2.

The method of the invention calculates the probabilities of allocating a cell as a server while taking into account the Handover HOm hysteresis margin.

The above calculated probabilities Proba_Ci_init represent the "initial" state only in calculating the allocation probabilities. Use is made of the status diagrams of FIG. 3.2. The terms "pij" are probabilities of a transition from a cell Cell_i to another cell Cell_j taking into account the handover hysteresis margin HOm.

During operation, the probabilities at a time n depend on the probability at time n−1 and on the probability of a transition given by the equations below:

Prob_C0(n)=Proba_C0(n−1)*p00+Proba_C1(n−1)*p100+Proba_C2(n−1)*p20

Proba_C1(n)=Proba_C1(n−1)*p11+Proba_C0(n−1)*p01+Proba_C2(n−1)*p21

Proba_C2(n)=Proba_C2(n−1)*p22+Proba_C0(n−1)*p02+Proba_C1(n−1)*p12 where $p01$=proba($C1>C0+HOm$ && $C1>C2$)

$p02$=proba($C2>C0+HOm$ && $C2>C1$)

$p00$=proba($C0>C1-HOm$ && $C0>C2-HOm$)=$1-p01-p02$.

$p10$=proba($C0>C1+HOm$ && $C0>C2$)

$p12$=proba($C2>C1+HOm$ && $C2>C0$)

$p11$=proba($C1>C0-HOm$ && $C1>C2-HOm$)=$1-p10-p12$ $p20$=proba($C0>C2+HOm$ && $C0>C1$)

$p21$=proba($C1>C2+HOm$ && $C1>C0$)

$p22$=proba($C2>C0-HOm$ && $C2>C1-HOm$)=$1-p21-p20$.

The allocation probabilities are attained when Proba_Ci(n)≈Proba_Ci(n−1), that is when they converge toward an asymptote after several iterations. They are shown in FIG. 3.3 for C1−C0=5 dB.

Obviously the sum of the probabilities is always unity.

On the other hand, at a given mean value, the same probability obtains. Lastly, as anticipated, the hysteresis effect favors the current server (with respect to the "init" probabilities).

The above calculated allocation probabilities depend on a value of the hysteresis margin obtained from parameters relating to switching of the server cell (handover HOm). It is important that this ability to obtain the parameters be preserved in the computing system. The procedure can be as follows:

(1) At the beginning, the computing system has at its disposal initializing probabilities "init." These are probabilities that were initially calculated by this system. They are independent of the handover HOm hysteresis margin but depend solely on the mean field strength. Because of the relations linking the three optimal servers, a single value causes the other two to be determined. A matrix Proba_init [36][36] is provided; because there is a maximum gap of 36 dB between C0, C1 and C2, the probabilities beyond 36 dB approach zero.

(2) Based on Proba_init[36][36] and on HOm, the allocation probabilities are calculated at the beginning of the CONSTRAINTS module and stored.

(3) Thereafter, for each pixel, the corresponding probability is recovered as a function of the three optimal servers.

The computing system applies, to each of these potential server cells in each mesh, a weighting coefficient having three components:

an allocation probability, a service probability, an above-ground structure weighting.

The allocation probability represents the probable distribution of time allocated to each of these potential server cells during a communication. This probability is calculated from the differential of predicted field strength between the potential server cells and takes into account a mean value of HO_MARGIN switching margin of 5 dB. The probability values are retrieved from the file "Proba_alloc.txt". The plot of FIG. 4.1 shows the allocation probability values as a function of the gap in field strength between C0 and C2 when C1=C2.

The service probability represents the ability of a cell to effectively gauge the service (as a function of the cell's received field strength in the mesh). The service probability is inferred from the gap between the predicted field strength and the (modifiable) value "MINI_FIELD" retrieved from the file "Frequencies.txt". "MINI_FIELD" is the field strength corresponding to a 50% service probability. This coefficient enhances the proportion of interference as a function of field strength (the higher the field strength, the larger the interference).

FIG. 2 indicates the probabilities for gap value field strengths between cells, MINI_C-FIELD. FIG. 2 indicates that for gap values less than −12 dB, the probability goes to 0.

Lastly the above-ground structure (or morphological) coefficient represents natural handover flows that follow terrain morphology. The cells with the same above-ground structure as the server cell are favored. This coefficient is retrieved from a file "Weight.text" in the form of a matrix involving the mesh's class of above-ground structures and the kind of traffic artery. This matrix is shown in FIG. 4.3.

The three coefficients are combined at each mesh to weight each of three optimal server cells and to represent the probability of each being the server cell.

Both the interference logs and the vicinities are taken into account by adding their effects (co-channel interference and adjacent channel interference) to the results from the coverage. This effect is in the form of a proportion retrieved from the file "Frequencies.txt".

These values are as follows:
PROPORTION_EXCEPTION for interference,
REAL_PROPORTION_ADJ_VIC as regards the adjacent channel vicinities and REAL_PROPORTION_COC_VIC for the co-channel vicinities.

To complete this first analysis or to correct it as a function of the actual network, the computing system 30 incorporates the following information into the constraints matrix:
interference logs: They are information about the actual terrain and allow palliating unpredicted or underestimated interference in the coverage computation;
vicinities: provide overlap zones; these neighboring zones are determined by computation, and are zones the user states are within the network;
neutral zones: make it possible to ignore irrelevant interference in certain zones (internal or external to the service zone, for instance woods).

The operations of the computing system 30 which enable the system to prepare and then verify the constraints matrix are the contents of the file.

Thus, system 30:
(1) takes into account the interference logs
(2) takes into account the neighbors,
(3) takes into account the neutral zones,
(4) calculates the constraint matrix.

The objective of the interference logs is to know how to perform a theoretical weighting by adding the interference logs measured in the network (terrain, statistics . . . ).

The objective is to inform the computing system about the detected terrain interferences before the interferences are even calculated theoretically. In this manner, any channel reallocations for cells having known incompatibility are eliminated. The computing system 30 ascertains interferences from the coverage predictions. The predictions might be subject to errors due to the inaccuracies in the terrain databases and due to the computing method.

Accordingly some interferences are not detected by the computing system 30.

The measurements about the "terrain" and the experience of the radio engineer enable these errors to be corrected by prediction. The corresponding information, which is called interference logs, must be supplied to the computer to be accounted for in the calculation of the computer interference constraints.

There are two types of interferences:
co-channel interference,
adjacent-channel interference.

The computer enables these two types of interferences to be inserted in one file (extension .CBR). This insertion takes place at the interface of the computing system.

Said file is updated by adding or deleting interference logs before calculating the computer calculates the constraints matrix and the consecutive frequency plans.

"Theme matrix" visualization must be carried out for each cell of the service zone. It allows visualizing for instance the constraints relating to one interfering cell and cells which are interfered with as a result of co-channel interference or adjacent channel interference.

The visualization is a good way to check the constraints. For instance two cells might be mutually opposite and have no calculated constraints, whereas the experience relating to "terrain" or measurements proves the contrary. In such an instance this new constraint is disclosed by being added to the extant list.

An interference log at a site between two given cells denotes interference identified by "terrain" measurements.

The computing system 30 takes into account an interference log by adding the value of field strength "Proportion_Exception" in the file "FREQUENCY.TXT" to the corresponding element in the constraint matrix.

For that purpose the user of the computing system uses a logic interface involving clicking, in the "Frequencies" menu, the command "Planning", then the sub-command "Interference Logs". A dialog box "Interference Logs" appearing on a display screen shows a list "Frequencies/Planning/Interference Logs". Using interactive pointers, the user clicks the "List" button. The dialog box "Logs" then appears on the screen.

If a log file already exists, one need only select it and click "enter," otherwise a file name is typed into "Your Selection" and the "enter" key is depressed.

In the latter case, the computing system 30 asks confirmation to create this file by displaying the question "creating?".

Once the user returns to the dialog box "interference log" (either after having "entered" an extant file or after having "created" a new file), he/she clicks an "add" button. A dialog box "add a log" appears on the screen. In the field "Site #" ("useful, public" site), the user types the # of the site in which one cell suffers interference and confirms by activating the "enter" key. A list of the site's cells is displayed (also the site name). From this list the user selects the interfered with cell and then, in the field "site #" ("public interference" zone) he/she types the site # of an interfering cell and confirms by depressing "enter". In this manner both the list of cell sites and the site name are displayed.

From this list the user selects the interfering cell and then the "nature of interference," either "co-channel interference" of "adjacent channel interference." After activating "name of person responsible" and "enter," the user, once back in the dialog box "interference logs" repeats the process (by again clicking the "add" button as many times as necessary).

The computing system 30 also takes into account neighboring cells or vicinities. Two cells are deemed to be neighboring in order to allow handovers; their coverages necessarily overlap. The objective of this accounting is to know how to weight the theoretical calculation by adding vicinity data (vicinity file allowing reducing the "HO losses").

The point in this instance is to notify the computer about the stated vicinities (as regards the network, not necessarily geographically). Such a statement of mutually neighboring cells does allow allocating co-channel frequencies or adjacent frequencies to these same cells, thereby precluding the danger of coverage interference in the overlap zones of those cells.

At stake, of course, is limiting as much as possible this kind of interference which causes many "HO Losses" (an indicator representing either the lost handovers or the cut calls) to improve the quality of results regarding frequencies.

The computing system 30 proposes three distinct methods to identify neighbors:
1. creating a personal file,
2. importing data
3. computation carried out by the "vicinities" menu of the computing system 30.

The computing system also takes into account neutral zones. The objective is to know how to identify the subscriber-free zones in order not to penalize the traffic zones in difficult cases.

In order to further improve the results from competing frequencies, neutral zones are advantageously defined for the cells having only a small amount or no intervention in the traffic flow. Preferably, the subscriber-free zones are ignored while accepting any interference in order to give priority to a high-traffic zone and thereby to free frequencies.

Typically these neutral zones prevent "polluting" the calculation of a frequency plan on account of the needless protection of a mountain looming over a city.

The following are other examples of neutral zones:
lakes
the sea
mountains
woods
traffic-free zones
foreign countries . . .

Another instance is that of national boundaries. There need not be any worry about interferences outside the covered territory. Therefore the neutral zones are not necessarily contained within the service zone.

The above modeling also can take into account the uncertainties of radio transmission.

In such a case, and having access to statistical tables for fluctuations in radio propagation as they affect the received strengths from the neighboring transmission stations 12 through 14, for instance meteorological conditions, the computer 30 determines corresponding probabilities to create an inversion of relative field strengths between two of the selected signal levels and modifies the order of classification. Computer 30 carries out composition by weighting the received signals as a function of the respective probabilities in order that one received signal will have the highest strength during a specified time interval.

It should be obvious to the expert that the present invention allows many embodiments in other specific designs without thereby leaving the scope of applicability as defined in the claims. Consequently the present embodiment modes of the invention must be considered illustrative while being modifiable within the field defined by the range of the attached claims, and the invention must not be considered limited by the details that were presented above.

What is claimed is:

1. A method of creating constraint matrices to be used in planning a cellular wireless telephone circuit whereby, when there is a given number of predetermined carrier frequencies $(f_i, f_j)$ to be allocated to a plurality of base radio stations having specific transmission powers with a service zone in order to manage a corresponding plurality of radio cells acting as server or interfering cells, comprising the following steps:

according to the positions of each mesh of a server cell, causing a computing system to work out a prediction of the field strength C received in this mesh of the service zone at one $(f_i)$ of the predetermined server cell frequencies, for each of these meshes, causing the computing system to calculate the field strength I of the interfering field generated by each of the cells other than the cell which is deemed to be the cell interfering with the cell in turn deemed to be the server cell by the computing system, for each of these meshes, causing the computing system to calculate the ratio C/I at the "server" cell, where I is the strength of the interference field generated by each of the other interference cells of the service zone and wherein the strength I of the interference field received in the mesh exceeds a given "MINI_INTERFERENCE_FIELD" value stored by the computing system, by integrating over the full service zone, causing the computing system to ascertain the global interference rate $tb_{ij}$ caused by the interference cells in the server cell, these values thereupon being displayed or stored in a so-called initial constraints matrix by displaying or storing field strengths (Ki, Li, Mi) at the intersections of the rows designating server cells and the columns designating interfering cells, based on this so-called "initial" constraints matrix, the system determines initialization probabilities of service that represent the probability a given cell shall be the server cell feeding the highest field strength to the cellular phone, the probability of service being inferred from the gap between the predicted field strength and the modifiable value of the "MINI_FIELD" strength stored in a file "Frequencies.txt".

2. Method as claimed in claim 1, wherein a first matrix or table is determined by assuming that each server cell and each of the interfering cells is in the co-channel mode.

3. Method as claimed in claim 1, wherein said modifiable field strength of the MINI_FIELD corresponds to a 50% probability of service, and the computing system selects the three cells constituting the optimal servers by comparing matrix values, and then computationally ascertains allocation probabilities and stores these probabilities in an allocation constraints matrix.

4. Method as claimed in one of claim 1, whereby, in each mesh, the computing system assigns to each of the said potential server cells a weighting coefficient containing three components:
probability of allocation
probability of service
probability of above-ground structure.
where these three coefficients are combined at each mesh to weight each of the three optimal cells and to represent the probability of each of them being the server cell.

5. Method as claimed in one of claim 1, whereby the computing system calculates—by means of the three probabilities of the three optimal servers and a relation which links them to the transition probabilities $p_{ij}$ from a cell_i to another cell_j while taking into account the hysteresis margin of the Hom handover—a single value Proba_init which in this manner allows stepwise determinating an initial probability matrix.

6. Method as claimed in one of claim 1, whereby the probability of allocation represents the probable time distribution allocated to each of the three potential server cells over the duration of a communication, said probability being calculated from the field strength differential of the potential server cells and taking into account of a mean actual switching margin "HO_MARGIN" of 5 dB.

7. Method as claimed in one of claim 1, whereby the probability values are stored in the file "Proba_alloc.txt".

8. Method as claimed in claim 1, whereby the above-ground structure coefficient (or morphological coefficient) allows representing the natural handover flows that move along the terrain morphology, where the cells of the same above-ground structure as the particular server cell are favored, said coefficient being retrieved from a file "Weight-.text" in the form of a matrix feeding the kind of above-ground structure and the type of traffic artery of the particular mesh.

9. Method whereby the computing system carries out the same calculations as defined in one of claim 1, for operating frequencies of cells of a channel which is adjacent to the frequency of the server cell.

10. Method as claimed in one of claim 1, whereby the computing system also takes into account the interference logs and where the adjacent areas also are taken into account by adding their effects (adjacent and co-channel interference) to the results derived from the coverage, said effects being in the form of a proportion retrieved from the file "Frequencies.txt" stored in memory.

11. Method as claimed in one of claim 1, wherein the computing system fitted with tables of statistical fluctuations of radio propagation conditions acting on the received signal strengths of the transmission from the stations ascertains corresponding probabilities in order that one received signal shall is of highest strength for a given time interval.

12. Apparatus for generating constraints matrices in order to use them in a system with which to plan a cellular wireless telephone network wherein a data system includes a computer arrangement for allocating a given number of predetermined carrier frequency values ($f_i, f_j$) to be allocated to a plurality of radio base stations having specified positions and transmitted powers within a service zone and stored in a database having data for managing a corresponding plurality of radio cells that act as server or interfering cells, the computer arrangement being arranged to:

(a) work out, according to the positions of each mesh (P) of a server cell, a predicted value C of received field strength within this mesh of the service zone at one of the predetermined frequencies ($f_1$) of the server cell, (b) calculate the field strength I of the interference field for each of the said meshes and created by each of the cells that the system deems being interfering cell(s) with respect the cell in turn deemed being the server cell by the computing system, and store said field strengths I, (c) calculate with respect to each of said meshes the value of a ratio C/I with respect to the "server cell," where I is the interference field strength caused by each of the other interfering cells of the service zone, the value of the received interference field strength I received in the mesh being larger than a predetermined "MINI_INTERFERENCE-FIELD" strength initially stored by the data system, (d) integrate over the entire service zone, a global interference proportion $tb_{ij}$ of the server cell caused by the interfering cells;

(e) causing said values to be arranged in an initial constraints matrix including intersections of rows designating server cells and columns designating interfering cells, field strengths (Ki, Li, Mi) being at the intersections, (f) determine initialization service probabilities based on said "initial" constraints, the initialization service probabilities representing the probability that a given cell is the server cell feeding the highest field strength to the cell phone, (g) infer the probability of service from the gap between the predicted field strength and the modifiable field strength of a "MINI_FIELD" field strength stored in a file "Frequencies .txt".

13. Apparatus as claimed in claim 12, wherein the computer arrangement is arranged for computing a given first matrix or table by assuming that each server cell and each interfering cell is in the co-channel mode and then for a second matrix by assuming that each interfering cell is in the adjacent mode relative to the server cell.

14. Apparatus as claimed in claim 12, wherein said modifiable field strength of the MINI_FIELD field corresponds to a probability of service of 50%, said computer arrangement being arranged to:
select the three cells constituting the optimal servers by comparing matrix values,
determine by computation the allocation probabilities and store these probabilities in an allocation constraints matrix.

15. Apparatus as claimed in claim 12, wherein, as regards each mesh, the computer arrangement is arranged for storing three coefficients representing:
allocation probability
allocation probability,
above-ground structure weighting, and
the computer arrangement is arranged for combining these coefficients for each mesh.

16. Apparatus as claimed in claim 12, wherein the computer arrangement is arranged for calculating a single value Proba_init and for stepwise constituting and specifying an initial probability matrix in response to the three probabilities of the three optimal servers retrieved from the computed matrices and a relation linking these probabilities to the probabilities $p_{ij}$ from a cell_i to another cel_j while taking into account the hysteresis margin Hom "handover".

17. Apparatus as claimed in claim 12, wherein the computer arrangement is arranged to store values of the allocation probabilities in the file "Proba_alloc.txt."

18. Apparatus as claimed in claim 12, wherein the computer arrangement is arranged to retrieve an above-ground structure coefficient from a file "Weight.txt" in the form of a matrix including indications of types of (a) above-ground structures and (b) a traffic artery relating to said mesh.

19. Apparatus as claimed in claim 12, wherein the computer arrangement is arranged to take into account logs of interferences and the adjacent areas by adding their effects to the results derived from the preceding calculations, and store said effects in the form of a proportion retrieved from a stored file "Frequencies.txt".

20. A computer system for generating constraint matrices for planning a cellular, wireless telephone network having a given number of specified carrier frequencies allocated to plural radio base stations having specified positions and transmission powers, the stations being capable of acting as a server cell or an interfering cell in a service zone, the computer system being arranged to (a) predict the field strength C of a field received in a mesh in the service zone at one of the server cell predetermined frequencies, (b) compute (i) for each of the meshes, the strength I of the interference field generated by the interfering cells, and (ii) C/I for the server cell, provided I of an interfering field received in the mesh is larger than a predetermined value and (c) determine a global interference proportion $tb_{ij}$ in a constraint matrix by interpreting C/I over the entire service zone.

21. A method of causing a computer system to generate constraint matrices for planning a cellular, wireless telephone network having a given number of specified carrier frequencies allocated to plural radio base stations having specified positions and transmission powers, the stations being capable of acting as a server cell or an interfering cell in a service zone, said method comprising activating the computer system so the computer system (a) predicts the field strength C of a field received in a mesh in the service zone at one of the server cell predetermined frequencies, (b) computes (i) for each of the meshes, the strength I of the interference field generated by the interfering cells, and (ii) C/I for the "server" cell, provided I of an interfering field received in the mesh is larger than a predetermined value; and (c) determines global interference proportion $tb_{ij}$ in a constraint matrix by interpreting C/I over the entire service zone.

22. A storage medium storing a program for causing a computer system to generate constraint matrices for planning a cellular, wireless telephone network having a given number of specified carrier frequencies allocated to plural radio base stations having specified positions and transmission powers, the stations being capable of acting as a server cell or an interfering cell in a service zone, the program causing the computer system to (a) predict the field strength C of a field received in a mesh in the service zone at one of the server cell predetermined frequencies;

(b) compute (i) for each of the meshes, the strength I of the interference field generated by the interfering cells, and (ii) C/I for the server cell provided I of an interfering field received in the mesh is larger than a predetermined value; and (c) determine a global interference proportion tb__in a constraint matrix by interpreting C/I over the entire service zone.

* * * * *